United States Patent

[11] 3,607,328

| [72] | Inventors | Henry J. Rose;<br>Albin F. Turbak, both of Danville, Ill. |
|---|---|---|
| [21] | Appl. No. | 763,942 |
| [22] | Filed | Sept. 30, 1968 |
| [45] | Patented | Sept. 21, 1971 |
| [73] | Assignee | Tee-Pak, Inc.<br>Chicago, Ill.<br>Continuation-in-part of application Ser. No. 431,181, Feb. 8, 1965, now abandoned. |

[54] PRODUCTION OF DELUSTERED CELLULOSIC SAUSAGE CASINGS
9 Claims, No Drawings

[52] U.S. Cl. ..................................................... 106/166, 106/192, 264/188
[51] Int. Cl. ......................................................... C08b 21/20
[50] Field of Search............................................. 106/166, 192; 264/188; 99/176

[56] References Cited
UNITED STATES PATENTS

| 3,150,984 | 9/1964 | Broadhead | 99/176 |
| 2,166,740 | 7/1939 | Karplus | 106/166 |
| 2,081,847 | 5/1937 | Byron | 106/166 |
| 2,063,001 | 12/1936 | Siebourg | 106/66 |
| 1,819,241 | 8/1931 | Hirschberger | 106/166 |

OTHER REFERENCES

Chemical Abstracts, vol. 44:3068h, 1950, copy in Chem. Library

The Condensed Chemical Dictionary, 6th ed., pp. 403, 404 & 1122

*Primary Examiner*—Morris Liebman
*Assistant Examiner*—T. Morris
*Attorney*—Neal J. Mosely ABSTRACT: Tubular regenerated cellulose films suitable for use as sausage casings are prepared in a highly delustered form by incorporating a mixture of two or more delustering agents having a refractive index substantially different from each other and from regenerated cellulose in a viscose solution prior to extrusion. The mixture of delustering materials is added to the viscose in solution in an inert cosolvent which is soluble in the viscose solution. The addition of the solution of mixed delustering materials produces a delusterant fog upon extrusion of the viscose and formation of a regenerated cellulose film or tube therefrom.

PRODUCTION OF DELUSTERED CELLULOSIC SAUSAGE CASINGS

CROSS-REFERENCE TO RELATED APPLICATION

This application is a continuation-in-part of copending application Ser. No. 431,181 filed Feb. 8, 1965, now abandoned.

BACKGROUND OF THE INVENTION

1. Field of the Invention

This invention relates to the production of delustered cellulosic sausage casings. Cellulosic sausage casings are ordinarily produced by the viscose process and are optically clear. For certain applications, there is a demand for a cellulosic casing which is delustered to produce a milky opalescent appearance.

2. Description of the Prior Art

In the art of rayon manufacture and to some extent in the cellophane art, there has been considerable work done in the preparation of delustered regenerated cellulose products. Koch U.S. Pat. No. 1,951,094 discloses the use of metal soaps and emulsions in delustering rayon fibers. Nonamaker U.S. Pat. No. 1,822,416 discloses the use of ground cellulose particles in delustering rayon fibers. Chavassieu U.S. Pat. No. 2,134,771 discloses the preparation of delustered rayon resembling natural wool in appearance by incorporation of sulfur particles therein. Kline U.S. Pat. No. 2,077,700 discloses the use of chlorinated organic materials in delustering rayon. Lilienfeld U.S. Pat. No. 2,021,863 discloses the use of various thiocarbonic esters as delustering agents in rayon. Gloor U.S. Pat. No. 2,227,495 discloses No. 2,227,495 use of terpenes and terpene ethers as delustering agents for rayon. Hegan and Taylor U.S. Pat. No. 1,922,952 discloses the incorporation of mineral oil and sulfonated oils into viscose for the preparation of delustered filaments, threads, and bands. Stockly and Witte U.S. Pat. No. 1,902,529 discloses the use of waxes in viscose for preparation of delustered rayon. Borzykowski U.S. Pat. No. 2,057,323 teaches the use of proteins in viscose as delustering agents. Dreyfus U.S. Pat. No 3,042,702 discloses the use of silicate esters in the preparation of delustered filaments. Smith U.S. Pat. NO. 2,334,358 discloses the delustering of rayon filaments with titanium oxide pigments. Hirschberger U.S. Pat. No. 1,819,241 discloses the treatment of rayon fibers with solutions of wax in oil. Bryon et al. U.S. Pat. No. 2,081,847 discloses the application of delustering agents in solution in a volatile organic solvent. Karplus U.S. Pat. NO. 2,166,741 discloses the introduction of delustering agents in certain volatile organic solvents.

The various types of delusterants described in the rayon art have not proved entirely satisfactory in the preparation of cellulose films or in application to other types of transparent or translucent extruded products.

SUMMARY OF THE INVENTION

This invention is based upon our discovery of a novel process for preparing delustered cellulosic sausage casings utilizing the viscose process. We have found that delustered cellulosic casings may be prepared having a substantial delustering effect and little loss of tensile strength by incorporating into viscose a solution of at least two different delustering agents in a cosolvent which is soluble in viscose. The delustering agents used are substantially immiscible with each other and with viscose or with regenerated cellulose and are added in solution in a cosolvent which is soluble in viscose. The delustering agents have a refractive index which is substantially different from each other and from the regenerated cellulose.

When the solution of two different delustering agents in a cosolvent is dispersed into viscose it forms a fine emulsion or fog throughout the viscose and the cosolvent dissolves in the viscose to leave behind mixed delusterant particles of substantially smaller size and substantially greater delustering effect than is possible by utilization of delustering agents either singly or applied in combination by other procedures.

DESCRIPTION OF THE PREFERRED EMBODIMENTS

This invention comprises a new and improved process for the preparation of delustered cellulosic sausage casings. In this process two or more delustering materials, which may be solid, liquid or gelataneous in form, having an index of refraction substantially different from each other and from regenerated cellulose, are added to viscose in solution in a cosolvent. Typical delusterants which may be used include but are not limited to fats, fatty oils such as castor oil, lard oil, corn oil, soya oil, safflower oil, tung oil, etc., vegetable waxes, animal waxes, mineral waxes, polyethylene waxes, mineral oils, fatty monoglycerides, and partially or fully acetylated fatty monoglycerides.

The delusterants are added in solution in cosolvents which are selected for chemical inertness, easy removal, and utility as solvents for the delusterants. Suitable cosolvents include dioxane, tetrahydrofuran, dimethylformamide, carbon disulfide, dimethyl sulfoxide, and other solvents which are soluble in viscose.

When two or more different delustering agents are dissolved in the cosolvent and dispersed into viscose as an emulsion or dispersion of fine droplets, the cosolvent is rapidly dissolved into the viscose with the result that the mixture of delustering materials forms even smaller droplets of mixed character which produce a high degree of delustering without substantial loss of tensile strength of the regenerated cellulose product. The viscose, with the delusterant dispersed therein, in extruded through a conventional annular die into coagulating and regenerating baths, in accordance with well-known procedures for the preparation of regenerated cellulose casing. After washing and drying, the casing produced has a semiopaque or translucent appearance characteristic of a highly delustered film.

In carrying out this invention it is absolutely essential that the delustering materials be dissolved and added together in a cosolvent to the viscose prior to extrusion. In extensive experimental work, it was found that the addition of single delustering materials did not produce comparable delustered casings regardless of the degree of dispersion or the loading of the delusterant in the film. It was also found that the addition of delustering materials separately in the preparation of the film, as distinguished from addition of delusterants in a cosolvent, resulted in the production of film having a substantially poorer delusterant effect.

The following nonlimiting examples are illustrative both of certain unsuccessful attempts to prepare delustered casings by other procedures and are illustrative of several satisfactory procedures for preparing delustered casings demonstrating the scope of this invention.

EXAMPLE 1

A commercial viscose was prepared having a 7.7 percent cellulose content and used to cast a number of films for evaluating the effectiveness of certain delustering materials. A small portion of the viscose was used to hand cast a 22-mil film of a glass plate using a drawbar. The film was coagulated and regenerated using conventional coagulation and regeneration baths. The film produced in this manner had a wet thickness of 3,6 mil and a dry thickness of 1.8–2.0 mil. The film was rewet and tested on as Instron tester for tensile strength. The rewet clear regenerated cellulose film was found to have a tensile strength of 3,194 p.s.i.

EXAMPLE 2

A commercial viscose was prepared having a 7.8 percent cellulose content, as in Example 1. To this viscose, there was added a solution consisting of 1 part mineral oil admixed with 1 part tetrahydrofuran in an amount sufficient to produce an oil concentration in the viscose of 4 percent by weight calculated on the weight of cellulose present. The mineral oil in solution in tetrahydrofuran was mixed thoroughly into the viscose to produce a milky dispersion of the mineral oil.

The mixture of oil and viscose was then used to cast a 22 mil film of a glass plate using a drawbar, as in Example 1. The film was coagulated and regenerated using conventional coagulation and regeneration baths. The film thus produced had a wet thickness of 3.7 mil and a dry thickness of 2.4 mil. The film was rewet and tested in an Instron tester, as in Example 1, and found to have a tensile strength of 2,265 p.s.i.

The oil-modified regenerated cellulose film thus produced was observed for delustering effect and found to have a rather poor delustering. The film was observed under a microscope and found to have oil particles ranging from 0.02 to 0.12 mm. in diameter, with the larger droplets predominating. The droplets appear to be transparent under magnification but give a relatively opaque appearance to the film with a rather poor delustering effect.

EXAMPLE 3

In this example, a commercial viscose, 7.7 percent cellulose content was mixed with a vegetable oil, castor oil, to determine its delustering effect. A solution was prepared consisting of 1 part castor oil and 1 part of tetrahydrofuran. A sufficient quantity of the solution was added to the viscose and thoroughly mixed therein to produce a dispersion of castor oil in a concentration of 4 percent based on the cellulose content present. The oil-treated viscose was used to cast a 22-mil film on a glass plate using a drawbar as in the previous examples. The cast film was subjected to a conventional coagulation and regeneration treatment (ammonium sulfate and sulfuric acid) as in he other examples. The film had a wet thickness of 3,8 mil and a dry thickness 1.9 mil. The film was rewet and measured for tensile strength on an Instron tester. The castor-oil-modified film had a rewet strength of 2,621 p.s.i.

The castor-oil-modified film was evaluated both by macroscopic and microscpoic visual examination. On the macroscopic level, the film was observed to have a weak luster but a lowered light transmission (loss of brightness) the delustering effect was rather poor. On the microscopic level, the castor part dispersion in the regenerated cellulose film was observed to consist of oil droplets ranging from 0.01–0.02 mm. in diameter. These droplets are relatively clear optically on a microscopic level but tend to opacify the film slightly.

EXAMPLE 4

In this example, a study was made of the delustering effect of two different oils added separately to viscose. A commercial viscose, 7.7 percent cellulose content, was used in he previous examples and divided into tow separate parts. Two separate solutions were prepared consisting of 1 past of mineral oil in 1 part tetrahydrofuran and 1 part castor oil in 1 part tetrahydrofuran. The mineral oil solution was added and thoroughly mixed in one of the viscose aliquots. The castor oil solution was added and thoroughly mixed in the other aliquot and the resulting viscose-oil solutions were then mixed together. The mineral oil and castor oil were each added in an amount equal to 2 percent of each based on the weight of cellulose in the total solution.

The mixture of oils and viscose was cast on a glass plate with a drawbar producing a 22-mil wet film. After coagulation and regeneration with a conventional ammonium sulfate and sulfuric acid treatment, there was obtained a regenerated cellulose film having a wet thickness of 3.6 mil and a dry thickness of 2.0 mil. This film was rewet and tested for tensile strength on the Instron tester. The film had an average tensile strength of 2,700 p.s.i.

The regenerated cellulose film containing mixed droplets of mineral oil and castor oil evaluated both on a microscopic and macroscopic level for delustering. The luster of the film was quite weak when observed on a macroscopic level. When the film was observed in the microscopic it was found to have a plurality of separate mineral oil and castor oil droplets ranging in size from 0.02 to 0.06 mm. The individual oil droplets were relatively clear optically. This film was observed to have a moderately good delustering but was too transparent to be satisfactory for commercial use.

EXAMPLE 5

In this example a mixture of two different oils is applied to a viscose in accordance with this invention to produce a highly delustered film. A commercial viscose is prepared, as in the previous examples having a 7.7 percent cellulose content. To this viscose, there was added a solution consisting of 1 part mineral oil and 1 part castor oil in 2 parts tetrahydrofuran. The solution of mineral oil and castor oil in tetrahydrofuran was added in an amount sufficient to produce a concentration of 2 percent of each the oils based on the weight of cellulose present. The solution was admixed thoroughly with the viscose and a fog of fine droplets of oil produced throughout the viscose.

The mixture of oils and viscose was cast on a glass plate with a drawbar to produce a 22-mil film. The film was coagulated and regenerated using a conventional coagulation and regeneration treatment as in the other examples. The regenerated cellulose film thus produced had a wet thickness of 3.5 mil and a dry thickness of 1.8–2.0 mil. The film was rewet and measured on the Instron tester for tensile strength. This film had a tensile strength of 3,142 p.s.i., which is essentially the same as the control. In fact, the change in tensile strength of this sample in relation to control is within experimental error for the test equipment and the method of testing used.

The regenerated cellulose film containing the mixed oils added in tetrahydrofuran solution was evaluated both macroscopically and microscopically for delusterant effect. On the macroscopic level the film was observed to have a satisfactory luster and appeared to have a soft translucent opalescent sheen. The film had physical properties, both tensile strength elongation at break, corresponding substantially to that of the control sample. When the delustered film was observed under the microscpoe it was found to contain a large number of small oil droplets ranging in size from 0.01 to 0.04 mm. The droplets were each opalescent or translucent due to the colloidal dispersion of the individual oils each in the other within the individual droplets. It should be noted that the individual droplets produced in the film in this example are droplets wherein the oils are present in two phases, i.e. each oil is dispersed within the other and does not separate in he formation of the oil dispersion in the viscose. This mixture of oils within the individual droplets results in the droplets themselves being opalescent and contributing a greater delustering effect than is possible using separate oil droplets as in the other examples.

In carrying out the preparation of a delustered film in accordance with this example any mixture of two different oils or similar materials having different refractive indexes may be used provided that the two separate delustering materials are dissolved in a cosolvent, such as tetrahydrofuran or the like, which is soluble in viscose. It is necessary that the cosolvent be soluble in viscose so that when the oil solution is dispersed in the viscose the solvent will dissolve rapidly away from the oils and leave the oils in a mixed form producing the two-phase opalescent droplets observed in the microscopic examination of the film.

EXAMPLE 6

A commercial viscose was prepared having a 7.7 percent cellulose content. To this viscose, there was added a solution consisting of 3 parts mineral oil and 3 parts castor oil in 8 parts of 1,4-dioxane. The solution was finely dispersed in the viscose in an amount sufficient to produce a mixed oil content of 3 percent in the regenerated cellulose product.

The mixture of oils and viscose was extruded through an annular die to produce a tubular casing in accordance with well-known procedures for the preparation of regenerated cellulose casing. The viscose-oil mixture was extruded through a die into a conventional coagulating and regenerating bath and subsequently wash and dried.

The washing and drying of the regenerated cellulose casing was effective to remove all of the dioxane from the product and leave a highly delustered cellulose casing. When the solvent is washed and/or evaporated from the regenerated cellulose casing, there are formed a large quantity of opalescent particles or droplets dispersed throughout the wall of the casing. The droplets are opalscent as a result of some dispersion of one of the oils into the other while dissolved in the dioxane cosolvent. The removal of the solvent effects the production of extremely fine opalescent particles or droplets dispersed to yield a more highly delustered casing film.

The delustering materials may vary form 0.1 to 12 percent weight of the regenerated cellulose casing without substantial loss in casing strength and produce a delustered product at all concentrations within this range.

EXAMPLE 7

A commercial viscose was prepared having a 7.7 percent cellulose content. To this viscose, there was added a solution consisting of 3 parts mineral oil and 3 parts castor oil in 6 parts of tetrahydrofuran. The solution was finely dispersed in the viscose in an amount sufficient to produce a mixed-oil content of 4 percent in the regenerated cellulose product.

The mixture of oils and viscose was extruded through an annular die to produce a tubular casing in accordance with well-known procedures for the preparation of regenerated cellulose casing. The viscose-oil mixture was extruded through a die into a conventional coagulating and regenerating bath and subsequently washed and dried.

The washing and drying of the regenerated cellulose casing was effective to remove all of the tetrahydrofuran from the product and leave a highly delustered cellulose casing. When the solvent is washed and/or evaporated from the regenerated cellulose casing, there are formed a large quantity of opalescent particles or droplets dispersed throughout the wall of the casing. The droplets are opalescent as a result of some dispersion of one of the oils into the other while dissolved in the tetrahydrofuran cosolvent. The removal of the solvent effects the production of extremely fine opalescent particles or droplets dispersed to yield a more highly delustered casing film.

The delustering materials may vary from 0.1 to 12 percent weight of the regenerated cellulose casing without substantial loss in casing strength and produce a delustered product at all concentrations within this range.

The delustered products which are produced in accordance with this invention are satisfactory as casings for food packaging or for processing of sausage meats. The delusterant materials used are nontoxic. The process used in preparing this delustered product is effective to produce an ultrafine colloidal dispersion of two different delustering materials within the film product. The use of two different delustering materials dissolved in a cosolvent which is soluble in viscose is effective to produce a finer dispersion of delusterant droplets or particles and thus produces a superior delustering effect. The delustering effect which is obtained utilizes not only the individual fine opalescent droplets of delustering materials but also the formation of ultrafine droplets or particles of one delustering material within droplets of the other delustering material. The process is simple and inexpensive to carry out and produces novel products with a higher delustering effect that has been produced by prior art techniques.

We claim:
1. A method of preparing a delustered film of regenerated cellulose which comprises,
   a. preparing a solution of at least two mutually insoluble delustering materials, having a refractive index substantially different from each other and from regenerated cellulose, in an inert cosolvent which is soluble in viscose,
   b. dispersing said solution of delustering materials into viscose,
   c. extruding the resulting dispersion to form a film, and
   d. coagulating and regenerating said extruded film to produce a delusterant fog throughout said extruded film comprising a dispersion of fine opalescent particles or droplets of said delusterant materials of colloidal size and comprising at least two phases.

2. A method as defined in claim 1 in which the delustering materials comprise 0.1–12.0 percent of the cellulose.

3. A method as defined in claim 1 in which the product is a tubular sausage casing.

4. A method as defined in claim 1 in which at least one of the delustering materials is normally a liquid.

5. A method as defined in claim 1 in which at least one of said delustering materials is normally a solid.

6. A method as defined in claim 1 in which the delustering materials are fats, oils, or waxes.

7. A method as defined in claim 1 in which the delustering materials are a vegetable oil and a mineral oil.

8. A method as defined in claim 1 in which said delustering materials are castor oil and mineral oil and said cosolvent is dioxane.

9. A method as defined in claim 1 in which said delustering materials are castor oil and mineral oil and said cosolvent is tetrahydrofuran.